Sept. 3, 1968 MASAHIKO FUKAMACHI 3,400,370
PROBABILITY COMPARATOR
Filed Dec. 19, 1962
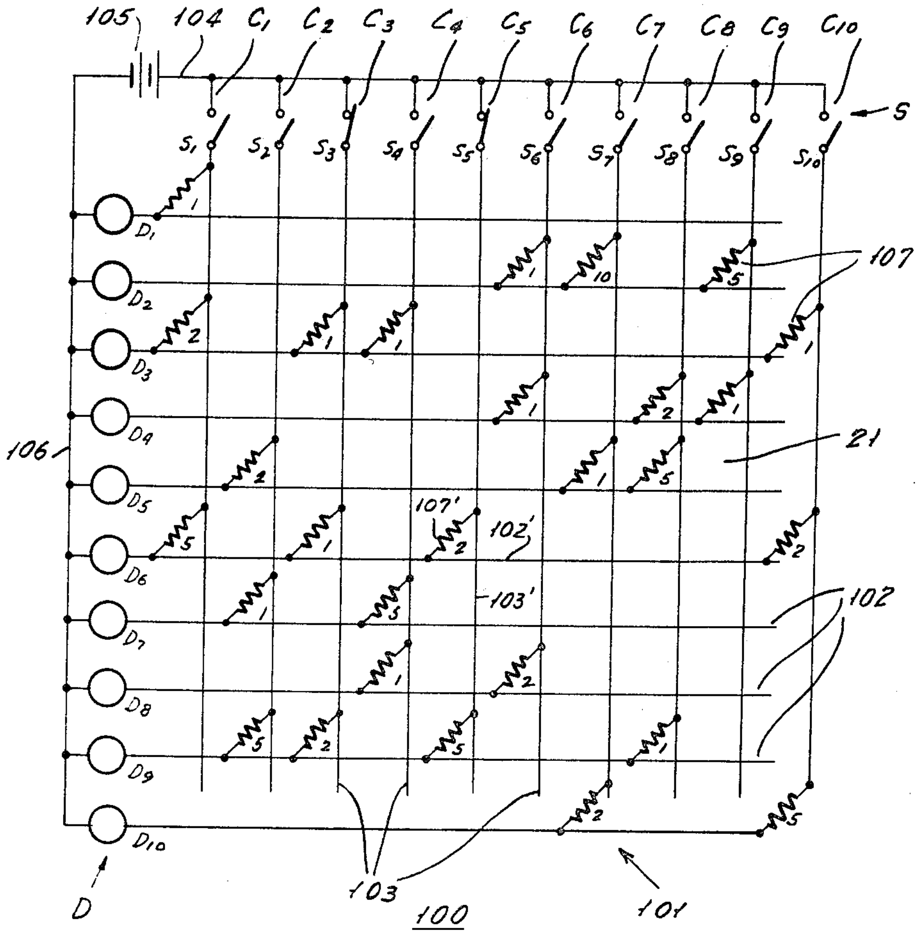
INVENTOR.
MASAHIKO FUKAMACHI
BY
OSTROLENK, FABER, GERB & SOFFEN
ATTORNEYS United States Patent Office 3,400,370

Patented Sept. 3, 1968

3,400,370
PROBABILITY COMPARATOR

Masahiko Fukamachi, Shiba Mita, Minatoku, Tokyo, Japan, assignor to Nippon Electric Company Limited, Shiba Mita, Minatoku, Tokyo, Japan, a corporation of Japan Filed Dec. 19, 1962, Ser. No. 245,767
Claims priority, application Japan, Dec. 25, 1961, 36/47,378
4 Claims. (Cl. 340—172.5)

The instant invention relates to computing devices and more particularly to a computing device arranged to operate as a probability comparator having means for inserting information representative of observed information which is suitably weighted by the computer and which further provides outputs representative of the probable conclusions which may be drawn from the weighted events observed in order to ascertain which of the conclusions is most accurate of said group of conclusions.

Many present day problems in both science and industry are approached and solved by a method of observing and recording events attendant with the problem determining the most probable conclusions which can be drawn as a consequence of these observed events and selecting from the group of said conclusions the most probable conclusion which may be drawn in light of the multiplicity of observed events.

One area in which the above method may be employed is that area concerned with the diagnostic phase of the medical profession. The first step of the method requires that the symptoms of a disease or ailment be related to the associated disease by computing the probability of the existence of such disease due to the observation of each independent symptom. The symptoms of any given patient are then observed and recorded. The probability of each disease due to the presence of each independent system is then recorded. Each symptom observed is then recorded in a like manner. The probability of a particular disease from all of the recorded symptoms is then determined and recorded by adding the probability of that particular disease for each of the observed symptoms. The probability of existence of all other diseases or ailments are then determined and recorded in a like manner. Each of the composite probabilities of each of the particular diseases or ailments which are related to the observed symptoms in the manner described above may then be compared one against the other in order to ascertain which of the particular diseases or ailments is most probably present.

The above procedure requires voluminous statistical data and appreciably complex arithmetic operations in order to properly and rigorously arrive at the most probable diagnostic conclusion. The method set forth above may likewise be employed in other areas of endeavor both in science and industry as well as that of the medical profession and the employment of this method is attendant by as much, if not more complexity, than the exemplary application set forth above.

The device of the instant application provides structural means for automatically carrying out the method set forth above in a rapid, rigorous manner so as to completely avoid the mathematical complexities referred to above.

The device of the instant invention is comprised of an electrical matrix having M columns and N rows wherein each of said rows are electrically connected to selected ones of said columns in a predetermined arrangement in accordance with the particular problem for which the comparator is being used to solve. The rows and columns which are electrically related in a predetermined manner are weighted by the use of predetermined admittances in order to establish the proper probability relationships between an observed event or symptom and an associated conclusion or disease.

The presence of an observed event is indicated by enabling a predetermined column while the conclusion or conclusions which may be drawn therefrom simultaneously become enabled due to the weighted connections between the particular enabled column and one or more of said rows. Each of said rows are provided with recording instruments which provide a reading the magnitude of which represents the probability of a conclusion in view of the particular observed event. In the case where a plurality of independent events are observed the columns associated therewith are enabled thereby enabling selected ones of said rows of the comparator affecting the recorded values for each of said rows. The probabilities of each of said conclusions which may be drawn from the plurality of recorded events are thereby automatically summed and the most probable conclusion which may be drawn from the events observed may then be determined by selecting the recorded value of the group of recorded values having the greatest magnitude. The above arrangement, while providing a rapid and yet rigorous procedure for arriving at the most probable conclusion, nevertheless has an extremely simple construction and arrangement for carrying out the above operation.

It is therefore one object of the instant invention to provide a probability comparator for automatically selecting the most probable conclusion which may be drawn from a plurality of independent observed events.

Still another object of the instant invention is to provide an all electronic probability comparator which is designed to automatically determine the most probable conclusion which may be drawn from a plurality of independent observed events.

Another object of the instant invention is to provide an all electronic probability comparator which is designed to automatically determine the most probable conclusion which may be drawn from a plurality of independent observed events, wherein said probability comparator comprises an electrical matrix.

Another object of the instant invention is to provide an all electronic probability comparator which is designed to automatically determine the most probable conclusion which may be drawn from a plurality of independent observed events, wherein the rows and columns of said matrix are related in a predetermined manner by weighted admittances.

Still another object of the instant invention is to provide an all electronic probability comparator which is designed to automatically determine the most probable conclusion which may be drawn from a plurality of independent observed events, wherein said matrix includes recording devices for recording the probabilities of a particular conclusion which may be drawn from the independent events observed.

These and other objects of the instant invention will become apparent when reading the accompanying description and drawings in which: FIGURE 1 shows a probability comparator designed in accordance with the principles of the instant invention.

Referring now to the drawings: FIGURE 1 shows a probability comparator 100 comprised of an electrical matrix 101 having row and column windings 102 and 103 respectively. The upper end of each of said column windings 103 is provided with a series connected switch S such that in the embodiment of FIGURE 1 which teaches ten columnar windings, ten switches $S_1$–$S_{10}$ are provided. The stationary contacts $C_1$–$C_{10}$ of said switches $S_1$–$S_{10}$ are connected in common to a bus 104 which is connected in series with voltage source 105. Each of the row windings 102 is provided with a series connected meter recording device D wherein ten such recording devices $D_1$–$D_{10}$ are provided for the ten row windings. The opposite terminals of each of said recording instruments $D_1$–$D_{10}$ are connected in common to a bus 106 which is series connected to the opposite terminal of voltage source 105.

As can be seen from FIGURE 1, selected ones of said row windings 102 are connected to said columnar windings 103 by means of weighted admittance elements 107. As one example, admittance element 107' has a first terminal electrically connected to columnar winding 103' and a second terminal electrically connected to row winding 102', thereby establishing a series path from switch $S_5$, winding 103', admittance 107', row winding 102', recording instrument $D_6$ and bus 106 to voltage source 105. In order that this series connected path be energized switch $S_5$ must be moved to the closed position, as shown in FIGURE 1. The reading indicated by the recording instrument $D_6$ is dependent upon the magnitude of current within the current loop established by the closure of switch $S_5$. The magnitude of current, in turn, is determined by the value of admittance element 107'. The selection of admittance element 107' is made such that the probability of a conclusion which may be drawn is related to an observed event in accordance with the admittance value of element 107'. As one example, the closure of switch $S_5$ may be held to be indicative of the observation of a particular sympton. The particular symptom is then related to a particular disease, or diseases, in accordance with past experience. Such statistical data is employed to relate the closure of switch $S_5$ to a reading of recording instrument $D_6$ which is indicative of the probability of a particular disease or ailment. For example, if the conclusion which may be drawn (i.e. the disease) has a probability of occurrence due to symptom $S_5$, which is extremely small, the admittance value of element 107' will be chosen to be substantially small causing a substantially small current through the established current loop thereby causing a small deflection (i.e. small recorded value) to be generated by recording instrument $D_6$. If the probability of the disease, however, is great due to the presence of event or symptom $S_5$, the admittance value of element 107' will be chosen to be substantially large in order that a substantially large current will be established in the current loop, resulting in a large deflection (i.e. recorded value) in meter $D_6$.

Thus the probability comparator 100 is set up in such a manner that all possible events or symptoms are represented by an associated columnar winding 103. All of the possible diseases which may flow from such symptoms are then represented by an associated row winding 102. The probability of existence of each disease due to each symptom (in accordance with statistically or empirically arrived at data) is then established by the weighted admittances 107 which link the columnar windings 103 to selected ones of the row windings 102, the values of each admittance element 107 establishing the relative probability between each disease and each symptom. It should be understood that while FIGURE 1 shows the use of ten row and ten column windings a greater or lesser number of such windings may be employed depending strictly upon the needs of the user and the embodiment discussed herein is thereby treated as being merely exemplary. As a further example of the operation of probability comparator 100, let it be assumed that the observed events or symptoms dictate a closure of switches $S_3$ and $S_5$ as shown in FIGURE 1. With this arrangement, no current will flow in any of the recording instruments $D_1$, $D_2$, $D_4$, $D_5$, $D_7$, $D_8$ and $D_{10}$, whereas current loops including the recording instruments $D_3$, $D_6$ and $D_9$ will be established. Let it further be assumed that the values of the weighted admittances have been suitably chosen such that the value of each of the admittance elements 107 is represented by the decimal number positioned adjacent each such admittance element. Assuming the value of the voltage source 105 to be one volt and the weight value of each admittance element 107 to be a mho value then the ammeter $D_3$ will record a value of one amp due to the closure of switch $S_3$ while the ammeters $D_6$ and $D_9$ will record respective values of one amp and two amps due to the closure of switch $S_3$. Simultaneously therewith ammeter $D_6$ will record an additional current value of two amps while ammeter $D_9$ will record an additional current value of five amps, both due to the closure of switch $S_5$. Thus collectively, ammeters $D_3$, $D_6$ and $D_9$ provide readings of one amp, three amps and seven amps respectively, all of said readings being due to the observed events or symptoms $S_3$ and $S_5$. It can readily be seen therefore that the most probable conclusion which can be drawn from these recorded events (i.e. the disease which is most probably present due to the observed admittance) is that conclusion (disease) to which ammeter $D_9$ relates.

It can therefore be seen that this arrangement may be employed for any similar application, the only modification of the system being the selection of the columnar windings which are to be connected to the row windings and the weighted values (i.e. admittances) of these connections, which connections and values are established in accordance with previously obtained statistical or empirical data.

Although the above description makes use of an arrangement in which fixed admittances are employed as elements for providing the weighting factors, it should be understood that variable admittances may be substituted in their stead which admittances may be conveniently set to appropriate values in accordance with the statistical data related to the particular problem to be solved. It is further possible to design all of the admittance elements to be of a plug-in construction to further facilitate the ease of usage of the comparator 100.

Still another modification which may be employed in the device of the instant invention is that of providing separate voltage sources, each of which may be independently adjusted, whereby said voltage source may be series connected with each of said columnar windings 103 in place of the single voltage source 105 of FIGURE 1. This arrangement provides additional flexibility of the comparator system by permitting an additional weighting factor to thereby be established. As one example, in the employment of the comparator 100 for diagnostic purposes a particular symptom may be present but more flexibility may be required in order to better establish the seriousness of such a symptom. For example, one observed symptom may be a feverish condition, however, it is quite significant to distinguish between a fever of say 100° F. and a fever of say 104° F. The employment of adjustable independent voltage sources thereby permits such flexibility to be introduced into the comparator system.

Although there has been described a preferred embodiment of this novel invention, many variations and modifications will now be apparent to those skilled in the art. Therefore, this invention is to be limited, not by the specific disclosure herein, but only by the appending claims.

The embodiments of the invention in which an exclusive privilege or property is claimed are defined as follows:

1. A probability comparator capable of comparing the magnitude of each probability of every possible conclusion $D_1$ through $D_m$ which may be drawn against the given state of observed phenomena $X_1$ through $X_n$ comprising a matrix having $n$ row and $m$ column windings associated respectively with conclusions and observed phenomena $X_1$ through $X_n$; a plurality of admittance elements electrically connecting selected ones of said row windings to selected ones of said column windings; said admittance elements having differing admittance values to correspond to the relative probability of the existence of a conclusion due to the presence of an observed event; means connected to each of said row windings for providing a reading related to the sum of all observed events related to each of said row windings.

2. A probability comparator capable of comparing the magnitude of each probability of every possible conclusion $D_1$ through $D_m$ which may be drawn against the given state of observed phenomena $X_1$ through $X_n$ comprising a matrix having *n* row and *m* column windings associated respectively with conclusions and observed phenomena $X_1$ through $X_n$; a plurality of admittance elements electrically connecting selected ones of said row windings to selected ones of said column windings; said admittance elements having differing admittance values to correspond to the relative probability of the existence of a conclusion due to the presence of an observed event; means connected to each of said row windings for providing a reading related to the sum of all observed events related to each of said row windings; an electrical source; switch means operable to indicate the presence of an observed event connected to each of said column windings; each of said switch means being adapted to connect said voltage source to selected ones of said row windings upon closure thereof.

3. A probability comparator capable of comparing the magnitude of each probability of every possible conclusion $D_1$ through $D_m$ which may be drawn against the given state of observed phenomena $X_1$ through $X_n$ comprising a matrix having *n* row and *m* column windings associated respectively with conclusions and observed phenomena $X_1$ through $X_n$; a plurality of admittance elements electrically connecting selected ones of said row windings to selected ones of said column windings; said admittance elements having differing admittance values to correspond to the relative probability of the existence of a conclusion due to the presence of an observed event; means connected to each of said row windings for providing a reading related to the sum of all observed events related to each of said row windings; an electrical source; switch means operable to indicate the presence of an observed event connected to each of said column windings; each of said switch means being adapted to connect said voltage source to selected ones of said row windings upon closure thereof; said reading means comprising a plurality of ammeters each being connected to an associated row winding.

4. A probability comparator capable of comparing the magnitude of each probability of every possible conclusion $D_1$ through $D_m$ which may be drawn against the given state of observed phenomena $X_1$ through $X_n$ comprising a matrix having *n* row and *m* column windings associated respectively with conclusions and observed phenomena $X_1$ through $X_n$; a plurality of admittance elements electrically connecting selected ones of said row windings to selected ones of said column windings; said admittance elements having differing admittance values to correspond to the relative probability of the existence of a conclusion due to the presence of an observed event; means connected to each of said row windings for providing a reading related to the sum of all observed events related to each of said row windings; an electrical source; switch means operable to indicate the presence of an observed event connected to each of said column windings; each of said switch means being adapted to connect said voltage source to selected ones of said row windings upon closure thereof; said reading means comprising a plurality of ammeters each being connected to an associated row winding; said electrical source comprising a plurality of adjustable voltage sources each connected in series with an associated column winding adapted for regulating the intensity or severity of an observed phenomena.

References Cited

UNITED STATES PATENTS 2,973,508 2/1961 Chadurjian ---------- 340—174

FOREIGN PATENTS 1,307,396 9/1962 France.

ROBERT C. BAILEY, *Primary Examiner.*

I. S. KAVRUKOV, *Assistant Examiner.*